UNITED STATES PATENT OFFICE 2,179,488

METHOD FOR MANUFACTURING KETONES

Clayton M. Beamer, Elizabeth, N. J., assignor to Standard Alcohol Company

No Drawing. Application November 7, 1936,
Serial No. 109,669

5 Claims. (Cl. 260—596)

This invention relates to an improved process for manufacturing ketones from secondary alcohols according to the equation $$RR'CHOH \rightarrow RR'CO + H_2$$

It is known that the above reaction may be effected by passing a secondary alcohol at elevated temperatures over substances acting as dehydrogenation catalysts. The dehydrogenation catalysts that may be used for forming ketones from secondary alcohols are cerium oxide, zinc oxide, magnesium oxide, manganese oxide, chromium oxide, or other difficultly reducible oxides. Also small percentages of alkaline earth oxides, and alkali carbonates, and inert binders may be incorporated to advantage. Copper, brass, and other metals were the first catalysts that were found to be useful for effecting this reaction.

It has been found that the above oxides give high conversion of secondary alcohols to ketones at temperatures ranging from about 650° to 750° F., while the above metals give good conversions at temperatures from about 900° to 1000° F.

It has been found, according to this invention, that the conversion of the secondary alcohol to ketone is materially increased when the oxides are supported by a heat-conducting material. The catalyst is prepared as follows: Water is added to the oxide to make a paste and turnings or small pieces of copper, aluminum, brass, steel, or "Carborundum" are coated with it. After the turnings are thoroughly covered with the paste, they are dried. The oxide should be uniformly attached to the turnings, although at times it may be necessary to repeat the coating and drying operation to secure an even layer of the catalyst.

In the following table, isopropyl alcohol was passed through a chamber 1½" in diameter and 40" long containing the various heat conducting materials coated with zinc oxide and externally heated by electricity with the following results:

| | Materials coated with ZnO | | | | |
|---|---|---|---|---|---|
| | Copper | Aluminum | Brass | Steel | "Carborundum" |
| Isopropyl alcohol cc. per hour | 1500 | 1500 | 1500 | 1500 | 1500 |
| Wall temperature __°F__ | 715 | 720 | 740 | 785 | 825 |
| Chamber outlet ____°F__ | 710 | 710 | 710 | 710 | 710 |
| Percent conversion to acetone | 78 | 78 | 76 | 58 | 63 |

It should be noted, according to the above results, that the wall temperatures using copper, aluminum, brass, steel, and "Carborundum" become progressively higher in the same order of their conductivity for the same outlet temperature.

The other oxides may also be used in a similar manner. Materials having a heat conductivity above 0.2 are found to be more effective for use as supports for the above dehydrogenation catalysts. The heat conductivity is the quantity of heat in calories which is transmitted per second through a plate 1 centimeter thick across an area of one square centimeter when the temperature difference is 1° C.

The following examples are submitted to show the conversion of secondary hexyl alcohol to ketone. Comparative results are given when brass turnings are used alone or zinc oxide on brass turnings.

| | Experiment No. — | | |
|---|---|---|---|
| Catalyst | 1<br>Brass turnings | 2<br>Zinc oxide on brass turnings | 3<br>Zinc oxide on brass turnings |
| Hours run | 216 | 208 | 144 |
| Space velocity | .98 | 1.0 | 1.16 |
| Percent ketone conversion | 75 | 90 | 87 |
| Temp. {Chamber outlet _____°F__ | 900 | 700 | 750 |
| {Chamber inlet _____°F__ | 800 | 640 | 650 |
| Percent acidity as HAc in crude ketone | .65 | .007 | .006 |
| Color of crude ketone | Brown | W.W. | Light straw |
| Sp. gr. of crude ketone | .8110 | .815 | .8145 |
| Percent H-C in crude ketone | 7.0 | 2.0 | 2.0 |
| Percent volume rec. (n theor.) | 96.5 | 99 | 99 |

Secondary propyl, butyl, amyl, and hexyl alcohols may likewise be converted into ketones. The advantages obtained by the use of this particular method of preparing ketones are that lower operating temperatures are used with an improvement in the quality of the crude ketone and the percentage yields.

Results, using as the catalyst zinc oxide coated on a heat conducting carrier such as brass, are:

| Ketone | Operating temperature | Space velocity | Conversion |
|---|---|---|---|
| | °F. | | Percent |
| Acetone | 650–750 | .96 | 78 |
| Methyl ethyl ketone | 650–750 | 1.02 | 82 |
| Methyl n. propyl | 650–750 | 1.10 | 80 |
| Methyl n. butyl | 650–750 | 1.12 | 85 |

$$\text{Space velocity} = \frac{\text{volume crude ketone per hour}}{\text{volume catalyst}}$$

It is not desired to be limited by any of the specific examples given or any of the theories of the operation of the invention which have been advanced, but it is intended to claim all inherent novelty in the invention as broadly as the prior art permits.

I claim:

1. The improved process for the manufacture of ketones which comprises subjecting the vapors of secondary alcohols to the action of copper coated with zinc oxide at a temperature ranging between 650° F. and 750° F.

2. The improved process for the manufacture of ketones which comprises subjecting the vapors of isopropyl alcohol to the action of copper coated with zinc oxide at a temperature ranging between 650° F. and 750° F.

3. The improved process for the manufacture of ketones which comprises subjecting the vapors of an aliphatic secondary alcohol to the action of aluminum coated with zinc oxide at a temperature ranging between 650° F. and 750° F.

4. The improved process for the manufacture of ketones which comprises subjecting the vapors of an aliphatic secondary alcohol to the action of brass coated with zinc oxide at a temperature ranging between 650° F. and 750° F.

5. The improved process for the manufacture of ketones which comprises subjecting a vapor of an aliphatic secondary alcohol at a temperature from about 650° to 750° F. to the action of a difficultly reducible dehydrogenating oxide catalyst coated on a substance having a heat conductivity of at least 0.2.

CLAYTON M. BEAMER.